(12) United States Patent
Hashimoto

(10) Patent No.: US 8,967,210 B2
(45) Date of Patent: Mar. 3, 2015

(54) PNEUMATIC TIRE WITH TREAD HAVING ZIGZAG SIPES AND NARROW GROOVES

(75) Inventor: Yoshimasa Hashimoto, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 717 days.

(21) Appl. No.: 12/677,228

(22) PCT Filed: Apr. 22, 2009

(86) PCT No.: PCT/JP2009/057979
§ 371 (c)(1),
(2), (4) Date: Mar. 9, 2010

(87) PCT Pub. No.: WO2009/145019
PCT Pub. Date: Dec. 3, 2009

(65) Prior Publication Data
US 2010/0193096 A1    Aug. 5, 2010

(30) Foreign Application Priority Data

May 28, 2008  (JP) ................................ 2008-139444

(51) Int. Cl.
*B60C 11/12*  (2006.01)
*B60C 11/13*  (2006.01)

(52) U.S. Cl.
CPC ............. *B60C 11/12* (2013.01); *B60C 11/1376* (2013.04); *B60C 2011/1231* (2013.04); *Y10S 152/03* (2013.01); *Y10S 152/902* (2013.01)
USPC ........... 152/209.15; 152/209.18; 152/DIG. 3; 152/902

(58) Field of Classification Search
CPC ............... B60C 11/12; B60C 11/1376; B60C 2011/1231
USPC ................. 152/209.15, 209.18, DIG. 3, 902
See application file for complete search history.

(56) References Cited

U.S. PATENT DOCUMENTS

| | | | | | |
|---|---|---|---|---|---|
| 2,716,435 | A | * | 8/1955 | Herzegh | 152/209.18 |
| 6,478,062 | B1 | * | 11/2002 | Schomburg | 152/DIG. 3 |
| 2003/0029537 | A1 | * | 2/2003 | Iwamura | 152/209.18 |

(Continued)

FOREIGN PATENT DOCUMENTS

| | | | | |
|---|---|---|---|---|
| JP | 04-218411 A | * | 8/1992 | |
| JP | 2001-191741 A | * | 7/2001 | |

(Continued)

OTHER PUBLICATIONS

Machine translation for Japan 2006-327245 (no date).*

(Continued)

*Primary Examiner* — Steven D Maki
(74) *Attorney, Agent, or Firm* — Carrier Blackman & Associates, P.C.; Joseph P. Carrier; William D. Blackman

(57) ABSTRACT

Provided is a pneumatic tire having further improved ice performance achieved by narrow grooves. The pneumatic tire of the present invention is provided, in a tread, with land sections formed by partitioning the tread by grooves, and each of the land sections is provide with narrow grooves in a ground contact surface of the land section. The angle of tilt of the narrow grooves relative to the tire's circumferential direction is set to be larger in end regions located at both sides of a center region in a tire's lateral direction in each of the land sections than in the center region.

8 Claims, 3 Drawing Sheets

(56) References Cited

U.S. PATENT DOCUMENTS

| | | | |
|---|---|---|---|
| 2004/0112494 A1* | 6/2004 | Colombo et al. | 152/209.18 |
| 2005/0167022 A1* | 8/2005 | Hashimoto | 152/DIG. 3 |
| 2006/0027296 A1* | 2/2006 | Tsubono et al. | 152/DIG. 3 |
| 2006/0032566 A1* | 2/2006 | Koya | 152/DIG. 3 |
| 2008/0135150 A1 | 6/2008 | Kiwaki et al. | |
| 2009/0229721 A1* | 9/2009 | Ikeda | 152/209.18 |

FOREIGN PATENT DOCUMENTS

| | | | |
|---|---|---|---|
| JP | 2001-260614 A | | 9/2001 |
| JP | 2002-046426 A | * | 2/2002 |
| JP | 2002-067621 A | * | 3/2002 |
| JP | 2006-151222 A | | 6/2006 |
| JP | 2006-151229 A | | 6/2006 |
| JP | 2006-151233 A | * | 6/2006 |
| JP | 2006-151236 A | | 6/2006 |
| JP | 2006-327245 A | * | 12/2006 |
| JP | 2007-216816 A | | 8/2007 |
| JP | 2008-296769 A | | 12/2008 |
| KR | 2006-0068056 A | * | 6/2006 |
| WO | 2006/059640 | | 6/2006 |

OTHER PUBLICATIONS

Machine translation for Japan 2002-046426 (no date).*
Machine translation for Japan 2001-191741 (no date).*
Machine translation for Korea 2006-0068056 (no date).*
Machine translation for Japan 2006-151233 (no date).*
Machine translation for Japan 2002-067621 (no date).*

* cited by examiner

PNEUMATIC TIRE WITH TREAD HAVING ZIGZAG SIPES AND NARROW GROOVES

TECHNICAL FIELD

The present invention relates to a pneumatic tire provided with narrow grooves in a ground contact surface of each land section. More specifically, the present invention relates to a pneumatic tire having further improved ice performance achieved by narrow grooves.

BACKGROUND ART

All-season tires and studless tires include, in their treads, multiple partitioned land sections each formed of a block or a rib, and multiple sipes are formed in each of the land sections. In order for such a pneumatic tire to achieve sufficient ice performance while the tire is brand-new and hence cannot obtain inherent properties of rubber, multiple narrow grooves each being shallower than a sipe are provided in a ground contact surface of each land section (see, for example, Patent Document 1).

The above-mentioned narrow grooves are generally arranged at certain pitches in a certain direction in the ground contact surface of each land section. When such narrow grooves are provided in the ground contact surface of each land section, the pneumatic tire achieves excellent ice performance due to edge effect and drainage effect of the narrow grooves while the tire is brand-new, and starts to achieve excellent ice performance due to the inherent properties of rubber by the time all the narrow grooves are worn out.

However, in these years, such pneumatic tires have been desired to have further improved ice performance while they are brand-new, and sufficient ice performance is not currently always achieved with the conventional narrow groves.

PRIOR ART DOCUMENT

Patent Document

Patent Document 1: Japanese patent application Kokai publication No. 2006-151222

SUMMARY OF THE INVENTION

Problem to be Solved by the Invention

An object of the present invention is to provide a pneumatic tire having further improved ice performance achieved by narrow grooves.

Means for Solving the Problem

In order to achieve the above object, a pneumatic tire which includes, in a tread, a plurality of land sections formed by partitioning the tread by grooves, and in which each of the land sections is provided with a plurality of narrow grooves in a ground contact surface of the land section, the narrow grooves each having a depth of 0.05 mm to 1.0 mm, each having a width of 0.1 mm to 0.8 mm, and having a pitch of 0.5 mm to 2.0 mm, the pneumatic tire characterized in that an angle of tilt of the narrow grooves relative to a tire's circumferential direction is set larger in end regions located at both sides of a center region in a tire's lateral direction in each of the land sections than in the center region.

Effects of the Invention

In the present invention, the narrow grooves are provided in the ground contact surface of each land section so that the angle of tilt of narrow groves relative to the tire's circumferential direction would be greater in the end regions of the land section than in the center region of the land section. With this configuration, the present invention achieves the maximum drainage effect and edge effect by the narrow grooves. Specifically, drainage tends to be improved by orienting the narrow grooves in the tire's circumferential direction, and the edge effect tends to be improved by orienting the narrow grooves in the tire's lateral direction. Here, the center region of each land section is poor in drainage since the distance to any one of the vertical grooves located at both sides of the land section in the tire's lateral direction is long. For this reason, the angle of tilt of the narrow grooves relative to the tire's circumferential direction is set relatively small in the center region, to increase the drainage. The end regions of each land section, on the other hand, are each excellent in drainage since the distance to a corresponding one of the vertical grooves located at both sides of the land section in the tire's lateral direction is short. For this reason, the angle of tilt of the narrow grooves relative to the tire's circumferential direction is set relatively large in the end regions, to increase the edge effect. This configuration makes it possible to achieve the maximum drainage effect and edge effect by the narrow grooves, and to thereby further increase the ice performance achieved by the narrow grooves compared with a conventional configuration.

In the present invention, it is preferable that the angle of tilt of the narrow grooves relative to the tire's circumferential direction is set at 0° to 50° in the center region of the land section, while the angle of tilt of the narrow grooves relative to the tire's circumferential direction is set at 45° to 90° in the end regions of the land section. In addition, it is preferable that a width of each of the end regions of the land section is set at 15% to 30% of that of the land section. With this configuration, the present invention can sufficiently achieve the drainage effect and the edge effect by the narrow grooves.

It is preferable that an area percentage of the narrow grooves to the land section is set at 20% to 45%. This configuration makes it possible to obtain reasonable tread stiffness during a period in which the pneumatic tire is brand-new and at the early stage of wear of the pneumatic tire, and to sufficiently achieve the drainage effect by the narrow grooves. In addition, it is preferable that the narrow grooves located in the center region of the land section be each arranged to be connected to a corresponding one of the narrow grooves located in each of the end regions of the land section. This configuration can increase the drainage effect by the narrow grooves.

It is necessary that each of the narrow grooves should have a depth of 0.05 mm to 1.0 mm, a width of 0.1 mm to 0.8 mm, and a pitch of 0.5 mm to 2.0 mm. This configuration makes it possible to obtain reasonable tread stiffness during a period in which the pneumatic tire is brand-new and at the early stage of wear of the pneumatic tire, and to sufficiently achieve the drainage effect by the narrow grooves.

Although the present invention is applicable to various kinds of pneumatic tires including all season tires, it is especially desirable that the present invention be applied to pneumatic tires for ice-bound or snow-covered roads including studless tires provided with multiple sipes in each land section.

BEST MODES FOR CARRYING OUT THE INVENTION

Figure 1:
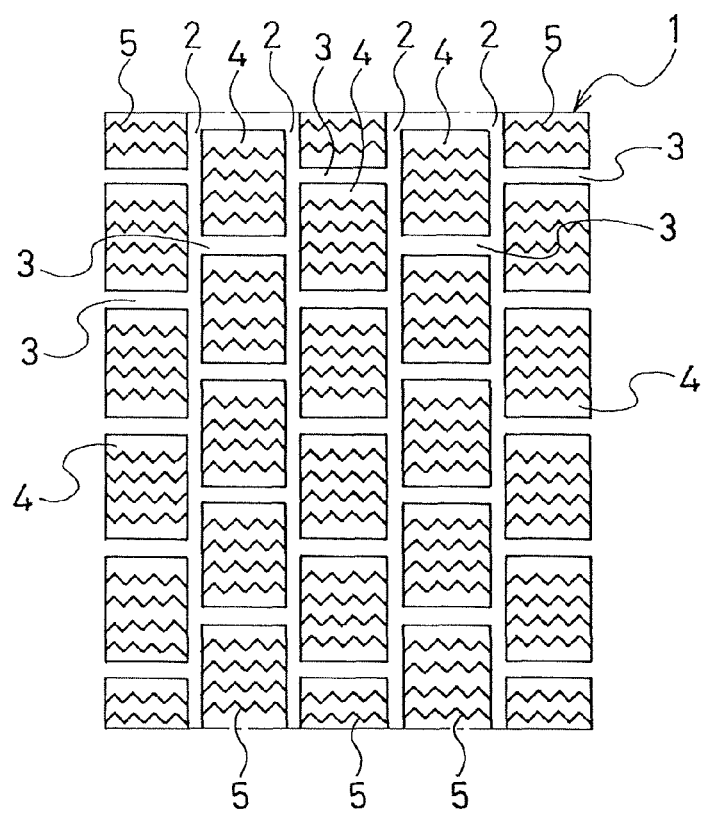
FIG. 1 is an expanded view showing a tread pattern of a pneumatic tire according to an embodiment of the present invention.

Hereinafter, a configuration of the present invention will be described in detail with reference to the accompanying drawings. FIG. 1 is a view showing a tread pattern of a pneumatic tire according to an embodiment of the present invention. As shown in FIG. 1, in a tread 1, multiple vertical grooves 2 each extending in the tire's circumferential direction and multiple lateral grooves 3 each extending in the tire's lateral direction are formed, and the tread 1 is partitioned by the vertical grooves 2 and the lateral grooves 3 into land sections 4, which are formed respectively of multiple blocks. The land sections 4 may each be a rib extending continuously in the tire's circumferential direction. In each of the land sections 4, multiple zigzag sipes 5 are provided. The depth of each of the sipes 5 is set in the range of 50% to 100% of the depth of each of the vertical grooves 2, and is generally set at 5 mm to 15 mm. Although omitted in FIG. 1, multiple narrow grooves are provided in a ground contact surface of each of the land sections 4.

Figure 2:
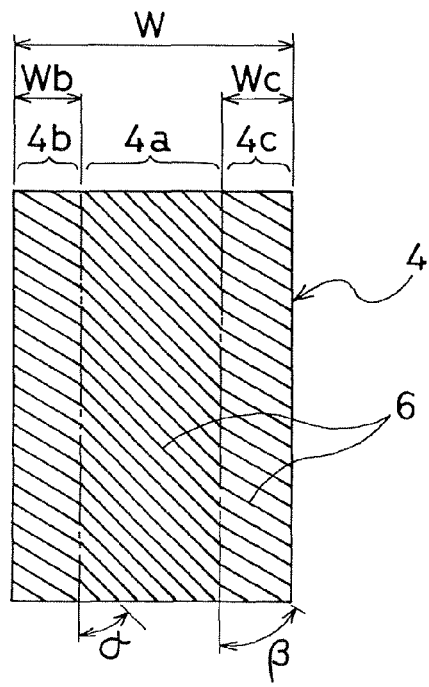
FIG. 2 is a plan view showing, in an enlarged manner, an example of a block used in the present invention.
Figure 3:
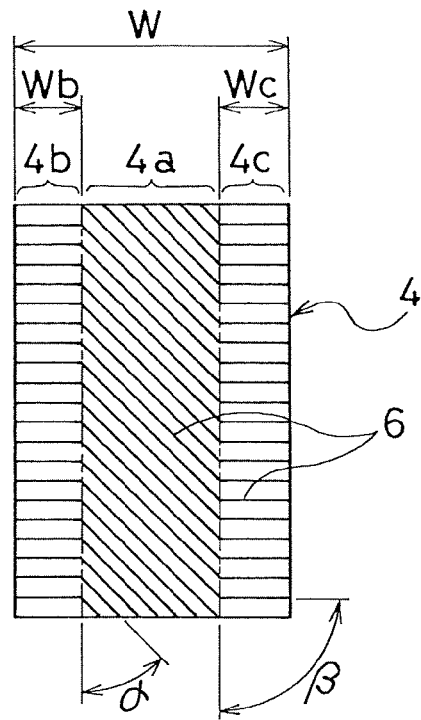
FIG. 3 is a plan view showing, in an enlarged manner, another example of the block used in the present invention.
Figure 4:
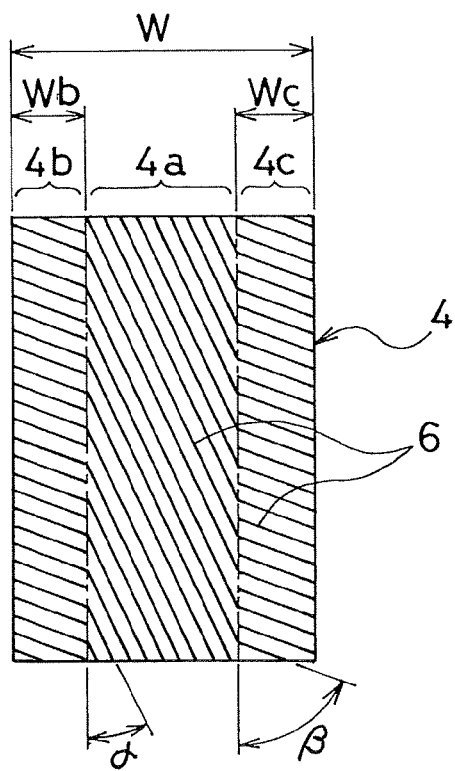
FIG. 4 is a plan view showing, in an enlarged manner, another example of the block used in the present invention.
Figure 5:
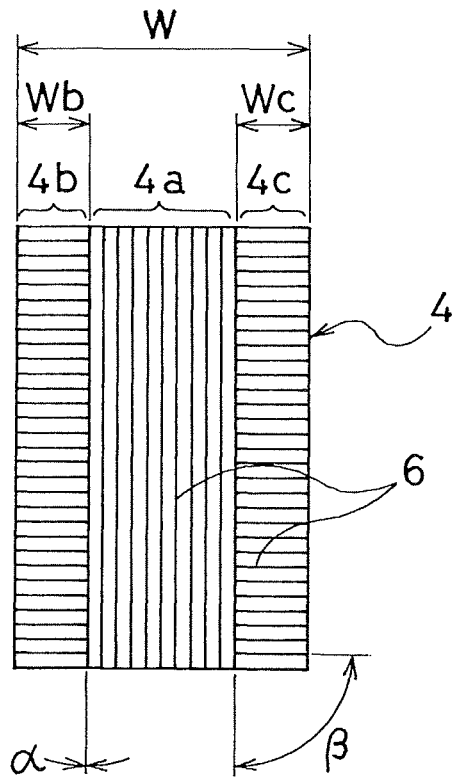
FIG. 5 is a plan view showing, in an enlarged manner, another example of the block used in the present invention.

FIG. 2 is a plan view showing, in an enlarged manner, an example of the blocks used in the present invention. Moreover, FIG. 3 to FIG. 5 are each a plan view showing, in an enlarged manner, another example of the blocks used in the present invention. In FIG. 2 to FIG. 5, the sipes are omitted to avoid confusion between the sipes and the narrow grooves. However, it will be understood that each of the land sections includes both the sipes and the narrow grooves overlapping and superimposed on the sipes. As shown in FIG. 2 to FIG. 5, multiple narrow grooves 6 shallower than the sipes 5 are provided in the ground contact surface of the land section 4. Assume that the land section 4 is divided into a center region 4a in a tire's lateral direction and end regions 4b and 4c located at both sides of the center region 4a in the tire's lateral direction. In this case, an angle β of tilt of the narrow grooves 6 relative to the tire's circumferential direction in each of the end regions 4b and 4c of the land section 4 is larger than an angle α of tilt of the narrow grooves 6 relative to the tire's circumferential direction in the center region 4a of the land section 4.

Thus, the pneumatic tire having the above-described configuration is provided with the narrow grooves 6 in the ground contact surface of each of the land sections 4 so that the angle of tilt of the narrow grooves 6 relative to the tire's circumferential direction would be larger in the end region 4b than in the center region 4a of the land section 4. The center region 4a of the land section 4 is poor in drainage since the distance to any one of the vertical grooves 2 located at both sides of the land section 4 in the tire's lateral direction is long. However, by setting the angle α of tilt of the narrow grooves 6 relative to the tire's circumferential direction to be relatively small in the center region 4a, the drainage can be increased. Meanwhile, the end regions 4b and 4c of the land section 4 are each excellent in drainage since the distance to a corresponding one of the vertical grooves 2 located at both the sides of the land section 4 in the tire's lateral direction is short. By setting the angle β of tilt of the narrow grooves 6 relative to the tire's circumferential direction in each of the end regions 4b and 4c of the land section 4 to be relatively large, the edge effect can be increased. Such appropriate setting of the angles α and β of tilt of the narrow grooves 6 depending on the regions makes it possible to achieve the maximum drainage effect and edge effect by the narrow grooves 6, and to further increase the ice performance achieved by the narrow grooves 6.

In the above-described pneumatic tire, the angle α of tilt of the narrow grooves 6 relative to the tire's circumferential direction in the center region 4a of the land section 4 is set in the range of 0° to 50°, while the angle β of tilt of the narrow grooves 6 relative to the tire's circumferential direction in each of the end regions 4b and 4c of the land section 4 is set in the range of 45° to 90°. This makes it possible to sufficiently achieve the drainage effect and the edge effect by the narrow grooves 6. If the angle α of tilt of the narrow grooves 6 is larger than 50°, the drainage effect in the center region 4a of the land section 4 decreases, which leads to a decrease in ground contact area at the time of braking on ice and consequently to a decrease in braking performance on ice. Moreover, if the angle β of tilt of the narrow grooves 6 is smaller than 45°, sufficient edge effect cannot be obtained, and consequently braking performance on ice decreases.

Widths Wb and Wc of the respective end regions 4b and 4c of the land section measured in the tire's lateral direction are each set in the range of 15% to 30% of a width W of the land section 4 measured in the tire's lateral direction. This makes it possible to sufficiently achieve the drainage effect and the edge effect by the narrow grooves. If the widths Wb and Wc of the end regions 4b and 4c of the land section 4 are each smaller than 15% of the width W of the land section 4, sufficient edge effect cannot be achieved, and consequently braking performance on ice decreases. If the widths Wb and Wc are each larger than 30% of the width W, on the other hand, drainage effect decreases in the center region 4a of the land section 4, which leads to a decrease in the ground contact area at the time of braking on ice and consequently to a decrease in braking performance on ice.

The percentage in area of the narrow grooves 6 in the land section 4 (the ratio of the total area of the narrow grooves to the area of the land section) is set in the range of 20% to 45%, and more preferably in the range of 25% to 40%. This makes it possible to obtain reasonable tread stiffness during a period in which the pneumatic tire is brand-new and at the early stage of wear of the pneumatic tire, and to sufficiently achieve the drainage effect by the narrow grooves 6. If the percentage in area of the narrow grooves 6 is smaller than 20%, sufficient drainage effect by the narrow grooves 6 cannot be achieved, and consequently braking performance on ice decreases. If the percentage in area of the narrow grooves 6 is larger than 45%, on the other hand, block stiffness decreases, and consequently dry performance and wet performance decrease.

In FIG. 2 to FIG. 4, the narrow grooves 6 located in the center region 4a of the land section 4 are each connected to corresponding ones of the narrow grooves 6 located in the end regions 4b and 4c of the land section 4. When the narrow grooves 6 are configured so as to continuously extend from the center region 4a to each of the end regions 4b and 4c of the land section 4, the drainage effect by the narrow grooves 6 can be increased. As shown in each of FIGS. 2-5, for each land section 4 of the tread the angle of tilt of the narrow grooves is constant in the center region thereof and the angle of tilt of the narrow grooves in each of the end regions thereof is also constant, and for each region of each land section the narrow grooves extend at the constant angle of continuously from one edge of the region to another edge of the region.

Figure 6:
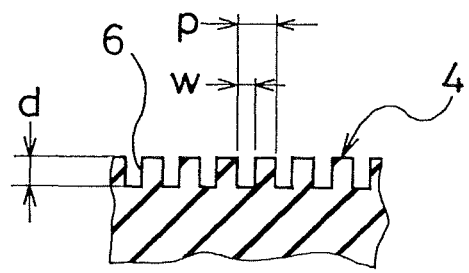
FIG. 6 is a cross-sectional view showing, in an enlarged manner, narrow grooves of the present invention.

FIG. 6 is a cross-sectional view showing, in an enlarged manner, the narrow grooves of the present invention. In FIG. 6, a depth d of each of the narrow grooves 6 is set in the range of 0.05 mm to 1.0 mm, and more preferably in the range of 0.1 mm to 0.5 mm. If the depth d of the narrow grooves 6 is smaller than 0.05 mm, sufficient drainage effect cannot be obtained. If the depth d is larger than 1.0 mm, on the other hand, tread stiffness decreases, and consequently dry performance and wet performance decrease.

A width w of each of the narrow grooves 6 is set in the range of 0.1 mm to 0.8 mm, and more preferably in the range of 0.2 mm to 0.5 mm. If the width w of the narrow grooves 6 is smaller than 0.1 mm, sufficient drainage effect cannot be obtained. If the width w is larger than 0.8 mm, on the other hand, the ground contact area of the land section 4 decreases, and consequently block stiffness decreases. If a pitch p of the narrow grooves 6 is set larger to avoid the decrease in block stiffness, drainage effect decreases as a consequence.

The pitch p of the narrow grooves 6 is set in the range of 0.5 mm to 2.0 mm, and more preferably in the range of 0.7 mm to 1.4 mm. If the pitch p of the narrow grooves 6 is smaller than 0.5 mm, block stiffness decreases. If the pitch p is larger than 2.0 mm, on the other hand, drainage effect decreases.

Hereinabove, a preferable embodiment of the present invention has been described in detail. However, it is to be understood that various modifications, substitutions and replacements can be made to the embodiment without departing from the spirit and scope of the present invention specified by the scope of the appended claims.

EXAMPLES

Tires of a conventional example 1 and examples 1 to 10 were manufactured. Each of the tires was a pneumatic tire for ice-bounded or snow-covered roads with a tire size of 195/65R15. The tire including, in a tread, multiple land sections (blocks) formed by partitioning the tread by grooves, was provided with multiple sipes in each land section and with multiple narrow grooves in the ground contact surface of each land section. The tires varied in angle α (°) of tilt of the narrow grooves relative to the tire's circumferential direction in the center region of each land section, the angle β (°) of tilt of the narrow grooves relative to the tire's circumferential direction in each end region of the land section, and ratio (%) in width of each end region to the land section, as shown in Table 1. In the conventional example 1 and the examples 1 to 10, the percentage in area of the narrow grooves in each land section was set at 35%, the depth of the narrow grooves was set at 0.3 mm, the width of the narrow grooves was set at 0.3 mm, and the pitch of the narrow grooves was set at 0.9 mm.

For the tires of each of the examples, evaluation was made in braking performance on ice in a period where the tires were brand-new, by the following evaluation method, and the results are also shown in Table 1.

Braking Performance on Ice:

Test tires were attached respectively to wheels having a rim size of 15×6½ J with an air pressure of 200 kPa, and the wheels were mounted on a rear drive vehicle with a displacement of 2000 cc. The vehicle was driven on ice at a speed of 40 km/h and was then stopped by ABS. The braking distance of the vehicle required until it stopped was measured. Each evaluation result is shown by using an inverse number of a measured value, as an index where the evaluation result of the conventional example 1 is 100. A larger index value indicates higher braking performance on ice.

TABLE 1

| | conventional example 1 | example 1 | example 2 | example 3 | example 4 | example 5 | example 6 | example 7 | example 8 | example 9 | example 10 |
|---|---|---|---|---|---|---|---|---|---|---|---|
| angle α (°) of tilt of narrow grooves in center region | 45 | 0 | 45 | 50 | 0 | 0 | 0 | 55 | 0 | 0 | 0 |
| angle β (°) of tilt of narrow grooves in each end region | 45 | 90 | 60 | 90 | 45 | 90 | 90 | 90 | 40 | 90 | 90 |
| width of each end region (%) | — | 20 | 20 | 20 | 20 | 15 | 30 | 20 | 20 | 10 | 35 |
| Braking performance on ice (index) | 100 | 107 | 110 | 107 | 107 | 106 | 105 | 104 | 104 | 104 | 104 |

As apparent from Table 1, the tires of the examples 1 to 10 had higher braking performance than that of the conventional example 1 in which the angle of tilt of the narrow grooves relative to the tire's circumferential direction was set the same in the entire area of each land section.

| EXPLANATION OF REFERENCE NUMERALS | |
|---|---|
| 1 | tread |
| 2 | vertical groove |
| 3 | lateral groove |
| 4 | land section |
| 4a | center region of land section |
| 4b, 4c | end region of land section |
| 5 | sipe |
| 6 | narrow groove |

What is claimed is:

1. A pneumatic tire which includes, in a tread, a plurality of land sections formed by partitioning the entire tread by separator grooves, and in which all of the land sections of the tread are each provided with a plurality of sipes and also with a plurality of narrow grooves overlapping and superimposed on the sipes in a ground contact surface of the land section, the sipes having a zigzag shape including multiple peaks and valleys, the narrow grooves having a shape different from the zigzag shape of the sipes, each of the narrow grooves having a depth of 0.05 mm to 1.0 mm, a width of 0.1 mm to 0.8 mm, and having a pitch of 0.5 mm to 2.0 mm, wherein all of the narrow grooves in each land section are provided such that an angle of tilt of the narrow grooves relative to a tire's circumferential direction is set larger in end regions, located at both sides of a center region in a tire's lateral direction in each of the land sections, than in the center region, and for each said land section the angle of tilt of the narrow grooves is constant in the center region thereof and the angle of tilt of the narrow grooves in each of the end regions thereof is also constant, and in each region of each said land section the narrow grooves extend at the constant angle of tilt continuously from one edge of the region to another edge of the region.

2. The pneumatic tire according to claim 1, wherein the angle of tilt of the narrow grooves relative to the tire's circumferential direction is set at 0° to 50° in the center region of each said land section, while the angle of tilt of the narrow grooves relative to the tire's circumferential direction is set at 45° to 90° in the end regions of each said land section.

3. The pneumatic tire according to claim 1, wherein a width of each of the end regions of the land section is set at 15% to 30% of that of the land section.

4. The pneumatic tire according of claim 1, wherein an area a percentage of a total area of the narrow grooves within the land section to the total area of the land section is set at 20% to 45%.

5. The pneumatic tire according to claim 1, wherein for each of the land sections, ends of the narrow grooves located in the center region of the land section are each arranged to either be connected to a corresponding one of the narrow grooves located in each of the end regions of the land section or to terminate at an edge of the land section.

6. The pneumatic tire according to claim 1, wherein for each said land section the angle of tilt of the narrow grooves in one of the end regions of the land section relative to a tire's circumferential direction is identical to the angle of tilt of the narrow grooves in the other end region thereof.

7. The pneumatic tire according to claim 1, wherein for each said land section at least one end of each of the narrow grooves in the center region of the land section extends continuously into an end of one of the narrow grooves in one of the end regions of the land section.

8. The pneumatic tire according to claim 1, wherein for each land section opposite ends of each of the narrow grooves in the center region of the land section extend to an edge of the land section either directly or through at least one of the narrow grooves in the end regions of the land section.

* * * * *